May 17, 1938.  H. V. LINHARD  2,117,672
DRAFT REGULATOR
Filed Dec. 16, 1935

INVENTOR.
Howard V. Linhard.
BY
Harness, Dickey, Pierce & Hann.
ATTORNEYS.

Patented May 17, 1938

2,117,672

UNITED STATES PATENT OFFICE 2,117,672

DRAFT REGULATOR

Howard V. Linhard, Detroit, Mich.

Application December 16, 1935, Serial No. 54,602

6 Claims. (Cl. 126—285)

The present invention relates to draft regulating apparatus, and in particular provides an improved draft regulator adapted for installation in the flue connection between a furnace or other combustion unit and an associated chimney or stack.

Objects of the present invention are to provide an improved draft regulator, which is simple in construction, economical of manufacture, and positive and effective in action.

Further objects of the invention are to provide an improved draft regulator adapted to maintain a predetermined definite draft intensity; to provide a draft regulator which is automatically controlled in accordance with the existing draft conditions; and to provide a draft regulator embodying automatically controlled means for mixing flue gases coming from a furnace or other combustion unit with external air to thereby control the effective draft upon the furnace or unit.

Further objects of the present invention are to provide an improved draft regulator of the above stated type, embodying an external shell having a door through which external air is admitted to a flue, and in which the movements of the door are automatically controlled; in which the movements of the door are controlled by the difference in pressure between the exterior and interior of the shell.

Further objects of the present invention are to provide a draft regulator embodying an improved structure for mixing external air with gases coming from a furnace to thereby effect a slowing up or regulation of the furnace draft; to provide such a structure embodying means for directing the incoming air into a swirling or centrifugal path and for directing the flue gases into an oppositely directed swirling or centrifugal path; and to provide such a structure embodying a plurality of helically directed fins or baffle plates to divert the air and gases into the above stated paths.

With the above and other objects in view which appear in the following description and in the appended claims, a preferred embodiment of the present invention is shown in the accompanying drawing, throughout which corresponding reference characters designate corresponding parts, and in which:

Figure 1:
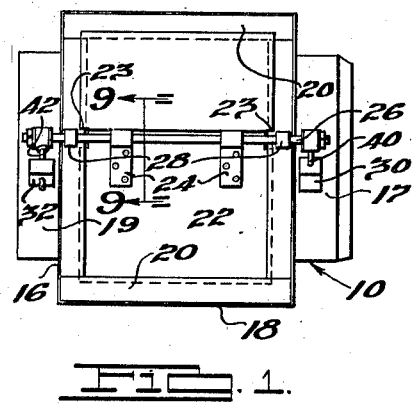
Figure 1 is a view in front elevation of the regulating device.

Referring to the drawing, the draft regulator designated generally as 10 is constructed as a unit, and is interposed directly between and so connects together a flue 12 leading from the furnace or other combustion unit, and a smoke pipe 14 which may lead to a stack or chimney. The furnace or other combustion unit with which the regulator is associated may be of any conventional or desired type, arranged for thermostatic or other automatic control if desired. Similarly, the stack construction may be conventional.

The regulator 10 comprises generally an outer shell which houses an inner or mixing structure. External air is admitted into the shell through an automatically controlled door, the position of which is determined by the pressures within and without the shell and by relatively adjustable balancing weights.

Figure 2:
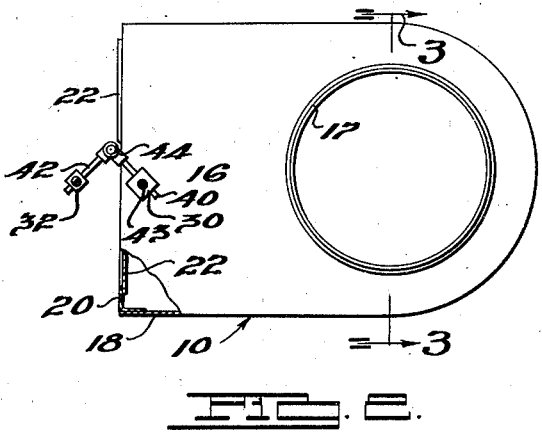
Figure 2 is a view in side elevation corresponding to Fig. 1.
Figure 3:
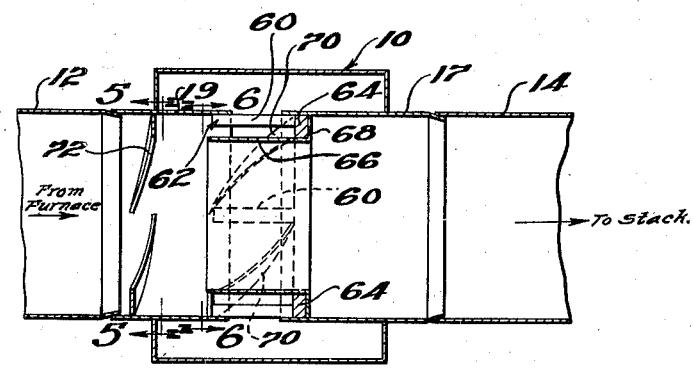
Figure 3 is a view in vertical section taken along the line 3—3 of Fig. 2.

The outer shell, which may be and preferably is formed of sheet metal, comprises a pair of similarly formed spaced side walls 16, which are connected together at their marginal edges by a continuous wall 18, which constitutes the top, one end wall, and bottom wall of the shell. As clearly appears in Figure 2, the rear end of the shell follows generally the curvature of the flue with which the regulator is associated, but is spaced a substantial distance therefrom, so that a free circulation of air is possible around all sides of the flue. Angle members 20 are suitably secured together and to the walls 16 and 18, to provide a rectangular framed front end of the shell. Nipples 17 and 19 extend into and outside of the shell and at their outer ends are conventionally connected to the flues 14 and 12, respectively.

The lower and major portion of the automatically controlled door 22 is positioned within the shell, and somewhat overlaps and abuts the side and bottom members 20. The upper and smaller portion of door 22 is disposed exteriorly of the shell, and correspondingly overlaps and abuts the side and top members 20. The sides of door 22 are notched at 23, the spacing between the notches being substantially equal to the spacing between the side members 20. The upper and lower door portions are offset laterally at 27, at the level of the notches, sufficiently to permit the upper portion 23 to overlie the exterior face to the top frame member 20, while the lower portion lies within the shell. The relative sizes of the upper and lower portions vary in practice. Generally it is found satisfactory to utilize a lower portion slightly greater than one-half the door height, so the weight of the lower portion slightly overbalances that of the upper portion.

Generally right-angled hinge plates 24 are suitably secured to door 22 and are provided with eyes 25 through which a hinge shaft 26 extends, and within which the shaft is welded so that the shaft and door move together. Plates 24 are positioned so that shaft 26 is disposed at substantially the level of the door offset 27. Shaft 26 is freely supported upon the side frame members 20 by yokes 28 and the ends thereof, which extend beyond the sides of the shell, carry the balancing and counterbalancing weights 30 and 32.

Figures 7, 8:
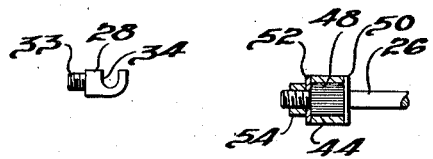
Figure 7 is a detailed view of one of the shaft supporting brackets.
Figure 8 is a fragmentary detailed view showing the hinge connection between the shaft and the draft regulator door.

As best shown in Fig. 7, each of the yokes 26 comprises a threaded shank section 33, through which it may be secured to a side frame member 20, and a U-shaped bearing portion 34, proportioned to freely receive shaft 26.

Figure 4:
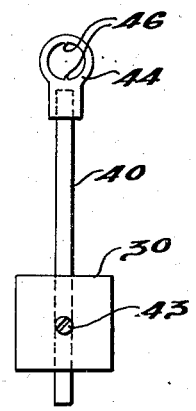
Figure 4 is a detailed view illustrating the mounting of the regulating weights.
Figures 5, 6, 9:
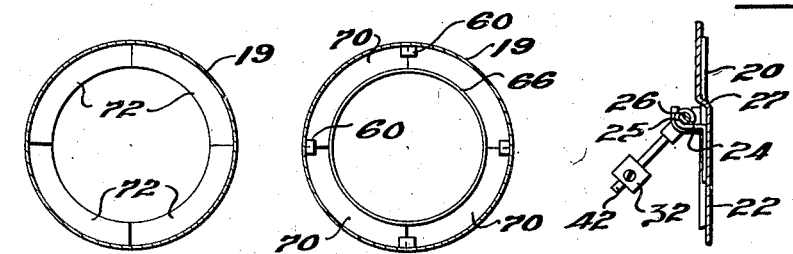
Figure 5 is a detailed view taken along the line 5—5 of Fig. 3.
Figure 6 is a detailed view taken along the line 6—6 of Fig. 3.
Figure 9 is a detail view of the door mounting.

The balancing weights 30 and 32 respectively are adjustably secured on arms 40 and 42 which are non-rotatively but adjustably fixed upon the outer ends of the shaft 26. The details of this arrangement are shown in Fig. 4, in which regulating weight 30 is secured upon arm 40 in adjustable relation by a set screw 43. The upper end of arm 40 is externally threaded to threadably receive a connecting member 44. Connecting member 44 is provided with a central opening having two opposed tongues or keys 46 formed therein, which cooperate with spline teeth formed on a collar 48 secured upon the end of shaft 26. A stop collar 50 secured upon shaft 26 limits axial movement of arm 40 with respect to collar 48 in one direction and a removable washer 52 correspondingly limits axial movement in the other direction. Collar 52 is retained in place by nut 54 and it will be understood that by removing the latter and washer 52, arm 40 and connection 44 may be slipped off of the end of shaft 26 and adjusted to a desired position with respect to it. Upon being re-assembled with arm 24, the spline teeth of collar 48 and tongues 46 serve to prevent relative rotation between shaft 26 and arm 40. It will be understood that the details of the mounting of arm 42 associated with the weight 32 correspond in all respects to those described with reference to arm 40.

Considering now the inner or mixing structure, the inner ends of the previously mentioned nipples 17 and 19 are maintained in axial alignment but in spaced relation by the legs 60 of a bracket 62, the base 64 of which is positioned within the nipple 17. The legs 60 are positioned around the base 64 in angularly spaced relation and may individually be secured to the nipples 17 and 19 in any suitable manner. The legs 60 thus form a connection between the nipples 17 and 19 without materially reducing the area of the opening between the ends of the nipples. The base 64 of bracket 62 is formed as an annular ring, having a central opening of substantially the same diameter as the thimble 66. Thimble 66 is provided with an outwardly turned flange 68 at one end, which abuts against and is suitably secured to the base 64. Thus supported, thimble 66, which may be formed of a relatively short section of flue pipe, extends some distance into the inner end of the nipple 17 and also a similar distance into the inner end of nipple 19.

In order to direct the air which enters the shell through the door 22 and passes into the nipple 12 through the opening between the ends of nipples 17 and 19, into a swirling path, a plurality of fins or vanes 70 are secured to the outer surface of the thimble 66. Any desired number of the fins 70 may be utilized, four being illustrated in the drawing, each of which extends from the base flange 68 of thimble 66 to the forward edge thereof, and each of which follows generally a helical path. The height of each fin 70 is preferably substantially equal to the spacing between the thimble 66 and the nipple 17, so that the fins 70 divide such space into a plurality of helically directed channels. The air entering and passing through such channels is thus given a centrifugal or swirling motion.

Air passing from the furnace or other unit and into the regulator through the nipple 12 is given an opposite centrifugal or swirling motion by a plurality of similarly formed vanes 72 which are suitably secured within the interior of nipple 12 and form baffles which extend from the surface thereof a short distance radially inwardly. As will be understood, depending upon the degree to which the fins 72 extend from the surface of nipple 12 towards the center thereof, a part or all of the air passing through nipple 12 may be given a centrifugal or swirling motion.

In operation, gases coming from the furnace and entering the unit through the nipple 12 are diverted into a centrifugal motion by the fins 72. The centrifugally moving gases meet air entering through the shell and the space between nipples 17 and 19, which is moving in an opposite swirling path. The oppositely moving gases and air mix rapidly and relatively completely, the temperature of the mixture being determined in proportion to the relative volumes and temperatures of the gases and of the air, as will be understood. The expansion of the incoming air, resulting from the rise in temperature thereof, results in a congestion of mixed air and gas in the unit, which blocks or retards the passage therethrough of the flue gases and correspondingly reduces the effective draft upon the furnace. The reduction in temperature of the flue gases, as effected by the mixing thereof with the incoming external air, aids in reducing the flue gas velocity and consequently in reducing the effective draft. The thus mixed flue gases and air pass out of the regulator through the thimble 66 and through the smoke pipe 14 to the chimney or stack.

The amount of air entering the regulator is determined by the degree to which the draft regulating door 22 is opened or closed. The position of door 22 in turn is determined by the adjustment of the balancing weights 30 and 32 and the difference in pressure between the exterior of the shell and the interior thereof. As will be evident, the external air acting upon the lower and larger portion of the door 22 tends to urge it inwardly to an open position while that acting on the upper and smaller portion tends to urge it closed. The pressure within the regulating unit, on the other hand, acts oppositely to the external pressure. The relatively larger weight 30 is normally adjusted to cooperate with the internal pressure on door 22 in maintaining the door in a closed position. The smaller weight 32 may, depending upon operating conditions, either be positioned to aid or oppose the larger weight 30. The use of the two weights is found to be advantageous in that it provides refinements of the adjustment which may be made, and also because, one weight being positioned at each end of the shaft 26, the two weights act to maintain the shaft 26 within the yokes 28 and prevent tilting thereof.

The pressure within the regulating unit, as will be evident, is determined by the velocity of the flue gases therethrough, a relatively high flue gas velocity resulting in a relatively low pressure within the unit and a relatively low flue gas velocity resulting in a relatively high pressure within the unit. The relatively high flue gas velocity may result, it will be understood, either from relatively high temperatures within the furnace with which the unit is associated, or from relatively low temperatures into which the stack or chimney discharges.

In use, accordingly, the balancing weights 30 and 32 are adjusted to provide for a certain degree of opening of door 22 in response to a predetermined pressure differential between the interior and exterior of the unit. The volume of air entering the shell through door 22 in response to this adjustment results in a corresponding reduction in flue gas temperature and consequently of the velocity of the flue gases discharged from the furnace. Any increase of the draft results in a reduction of the pressure within the unit and consequently an inward swinging of the door 22, thus admitting a greater quantity of external air, and offsetting the increase in draft. An increase in the pressure within the regulator, resulting either from a decrease in the temperature of the flue gases coming from the furnace or a decrease in the external draft from the chimney, results in a closing movement of the door 22, reducing the amount of air admitted thereto, and correspondingly reduces the effect of the regulator upon the flue gas temperature and velocity. Door 22 thus swings inwardly or outwardly under the influence of the differential pressures thereon and the regulating weights, and tends to maintain a predetermined definite flue gas velocity. If the draft upon the furnace tends to fall below the predetermined value for which the device is set, the door 22 falls to a completely closed position engaging the frame members 20 and substantially sealing the regulator and rendering it ineffective. The regulator is thus effective to oppose an increase of the draft upon the furnace above a selected value, but automatically becomes ineffective and thus does not interfere with the draft, if such draft tends to fall below the selected value.

It will be evident from the foregoing that the entire assembly may be relatively economically manufactured and assembled. The device is also relatively compact, and is not materially larger than the size of the usual flue connection between the furnace and the chimney and thus can be installed in relatively crowded quarters. The compact size of the unit also facilitates the inspection and repair of the parts, all of the interior structure being readily available upon swinging the door 22 inwardly.

Although a specific embodiment of the present invention has been described, it will be evident that various changes in the form, number and arrangement of parts may be made within the spirit and scope thereof.

What is claimed is:

1. A draft regulator for association with a flue comprising, in combination, an outer shell having an opening; a door for controlling the admission of air through said opening; means within said shell for diverting incoming air into a centrifugal path; and additional means for diverting gases passing through said flue into an oppositely directed centrifugal path.

2. A draft regulator for association with a flue comprising an enclosure communicating with the interior of said flue for admitting external air to said flue, means within said enclosure for diverting said air into a swirling path, and additional means for diverting gases passing through said flue into an oppositely directed swirling path.

3. A draft regulator for association with a flue comprising, in combination, an enclosure adapted for connection into said flue, an inlet nipple extending into said enclosure, an outlet nipple extending into said enclosure, the ends of said nipples being spaced to define an opening therebetween, a thimble of lesser diameter than said nipples secured within one of said nipples and extending into the other nipple, deflecting fins carried by said thimble, and additional deflecting fins positioned within one of said nipples.

4. A draft regulator for association with a flue having an opening into the interior thereof comprising, in combination, an outer shell encompassing said flue opening and having an opening; a door for controlling the admission of air through said openings; means securing said door in said shell opening to be acted upon by a differential between the pressure within and without said enclosure; adjustable means biasing said door to a closed position; a thimble positioned within said flue in registry with said flue opening around and through which said air may pass; and means carried by the thimble externally thereof for diverting said air into a swirling path.

5. A draft regulator for a flue having an opening therein to admit external air; a thimble positioned within the flue for passing flue gases and around and through which the air may pass; and means carried on the outside of the thimble for directing the air into a swirling path before it enters the thimble.

6. A draft regulator for a flue having an opening therein to admit external air; a thimble positioned within the flue for passing flue gases and around and through which the air may pass; and means positioned within the flue adjacent the entrance to the thimble for diverting the flue gases into a swirling path for intermixing with the external air.

HOWARD V. LINHARD.